(12) United States Patent
Biederman

(10) Patent No.: US 7,240,224 B1
(45) Date of Patent: Jul. 3, 2007

(54) INLINE POWER BASED DEVICE COMMUNICATIONS

(75) Inventor: Daniel C. Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 10/651,596

(22) Filed: Aug. 29, 2003

(51) Int. Cl.
- G06F 1/00 (2006.01)
- G06F 1/26 (2006.01)
- G06F 1/32 (2006.01)
- G06F 11/30 (2006.01)

(52) U.S. Cl. ............... 713/300; 713/310; 713/320; 713/340

(58) Field of Classification Search ........... 713/300, 713/320

See application file for complete search history.

(56) References Cited

U.S. PATENT DOCUMENTS

| | | | |
|---|---|---|---|
| 5,406,260 A * | 4/1995 | Cummings et al. | 340/568.2 |
| 6,218,930 B1 | 4/2001 | Katzenberg | |
| 6,701,443 B1 * | 3/2004 | Bell | 713/300 |
| 6,762,675 B1 * | 7/2004 | Cafiero et al. | 340/10.42 |
| 6,874,093 B2 * | 3/2005 | Bell | 713/300 |

OTHER PUBLICATIONS

Kiss, Peter, "Chapter 3: Cascaded Delta-Sigma ADCs", paper: Adaptive Digital Compensation of Analog Circuit Imperfections for Cascaded Delta-Sigma Analog-to-Digital Converters, Center for Design of Analog-Digital Integrated Circuits, Oregon State Univ., Dec. 31, 1999, pp. 45-58.
"Chapter 3, Cascaded Delta-Sigma ADCs", pp. 45-71.

* cited by examiner

Primary Examiner—Rehana Perveen
Assistant Examiner—Michael J. Brown
(74) Attorney, Agent, or Firm—Thelen Reid Brown Raysman & Steiner LLP; David B. Ritchie

(57) ABSTRACT

A network power system that is capable of communicating and resolving various inline power allocation issues. The system includes a power source equipment having at least one output power interface capable of transmitting inline power, at least one powered device having an input power interface capable of receiving inline power, and a first transmission media that is coupled between the power source equipment and the at least one powered device. Either or both of the power source equipment and the at least one powered device includes a negotiator that is capable of communicating and resolving the at least one inline power allocation issue. The negotiator, independently or in combination with other negotiators, reaches a negotiated decision and performs at least one response function in an effort to resolve the at least one inline power allocation issue. The system may have a multi-point layout or be experiencing a power outage condition.

40 Claims, 2 Drawing Sheets

INLINE POWER BASED DEVICE COMMUNICATIONS

FIELD OF THE INVENTION

The present invention relates generally to a network power system including power source equipment, at least one powered device, and transmission media. More specifically, the present invention relates to a network power system capable of communicating and resolving various inline power allocation issues.

BACKGROUND OF THE INVENTION

In the field of networks, there are instances when it is desired or required that data terminal equipment (DTE) be able to draw power from the same generic cabling as that used for data transmission. DTE devices may include telephones, Voice over Internet Protocol (VoIP or IP or Ethernet) telephones, network access devices, computers, and the like. Such a power scheme is known as inline or phantom power or power via a media dependent interface (MDI). Various example power via MDI schemes exist. These include a proprietary scheme from Cisco Systems, Inc. (Cisco) and a standard scheme from the Institute of Electrical and Electronics Engineers (IEEE). The proprietary scheme from Cisco will be referred to as Cisco legacy power. The IEEE scheme is known as IEEE 802.3af standard power and will be referred to as IEEE standard power. Although these two inline power schemes have some aspects in common, they are not entirely compatible with one another.

Turning first to FIG. 1, a schematic diagram of a network power system 10 having power source equipment (PSE) 12, a plurality of powered devices (PD) 14A-N, and a plurality of corresponding transmission media 16A-N is shown. The plurality of transmission media 16A-N are connected to the corresponding power source equipment 12 and powered devices 14A-N through a power interface at each end of the transmission media. Each transmission media may contain a plurality of conductors. For example, the current Ethernet standard is a minimum of two twisted-pair cables for a total of four conductors. The length and routing of the transmission media will depend on the circumstances and the applicable communications protocol. The number and location of each of the plurality of powered devices 14A-N will depend on the circumstances. The power source equipment 12 may also be variously located based on the circumstances. The power source equipment 12 may be at one end of the network or it might be somewhere between the ends of the network. The multiple power interfaces of the power source equipment 12 are often referred to as ports. The number of ports will vary. In the least complicated point-to-point layout, one port is connected to one and only one powered device. The multiple transmission media are often referred to as links between the power source equipment and the various powered devices. In order for the network power system 10 to operate correctly, the power source equipment 12 and the plurality of powered devices 14A-N must be compatible with one another.

BRIEF DESCRIPTION OF THE INVENTION

A network power system that is capable of communicating and resolving various inline power allocation issues is disclosed. The system includes a power source equipment having at least one output power interface capable of transmitting inline power, at least one powered device having an input power interface capable of receiving inline power, and a first transmission media that is coupled between the power source equipment and the at least one powered device. Either or both of the power source equipment and the at least one powered device includes a negotiator that is capable of communicating and resolving the at least one inline power allocation issue. The negotiator, independently or in combination with other negotiators, reaches a negotiated decision and performs at least one response function in an effort to resolve the at least one inline power allocation issue. The system may have a multi-point layout or be experiencing a power outage condition.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of an apparatus and method for inline power based device communications. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described herein.

Figure 1:
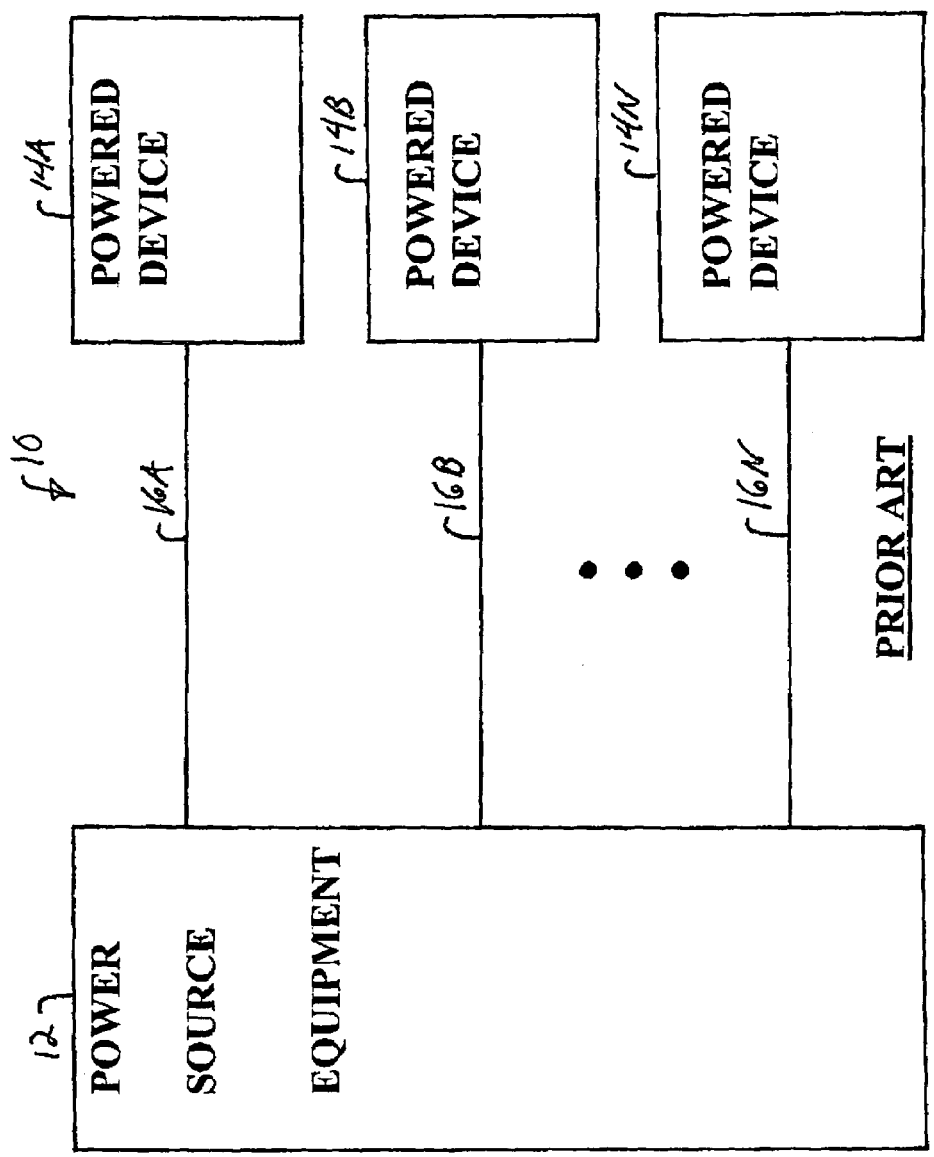
FIG. 1 is a schematic diagram of a network power system having power source equipment, a plurality of powered devices, and a plurality of corresponding transmission media.

Recall that the layout shown in FIG. 1 is point-to-point. This layout simplifies some of the assumptions made by the inline power schemes presented above. In practice, such a layout may be complicated by the addition of powered devices that are connected to other powered devices rather than directly to the power source equipment. Even if the power source equipment has ports available, for various reasons it may be more practical to connect to a powered device rather than to the power source equipment. For example, it might be much easier for a user to connect a lap top computer to a receptacle on the back of an IP telephone on their desk then to a receptacle on the wall behind their file cabinet. The user may not recognize that this makes the layout point-to-multi-point rather than point-to-point. This seemingly innocent choice can have unknown consequences for the network power system 10. The detection and powering algorithms of the inline power schemes presented above are likely to be compromised by layouts that are multi-point as opposed to point-to-point. The result being unpredictable performance and possibly damaged equipment.

Figure 2:
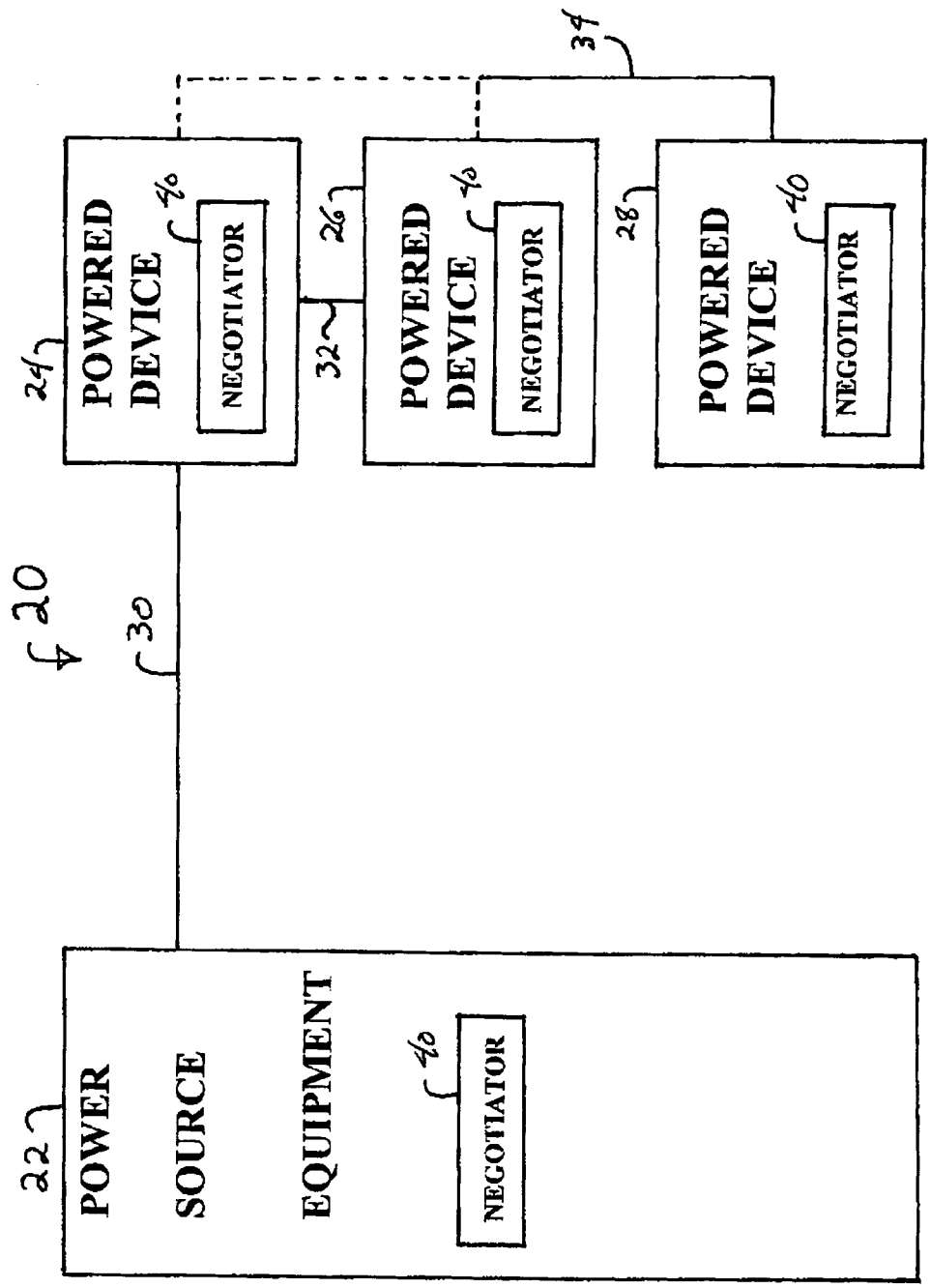
FIG. 2 is a schematic diagram according to the present invention of a network power system having power source equipment, three powered devices, and three transmission media.

Turning now to FIG. 2, a schematic diagram according to the present invention of a network power system 20 having power source equipment 22, three powered devices 24, 26, and 28, and three transmission media 30, 32, and 34 is shown. The system 20 has been simplified to provide one example of a multi-point layout. In practice, the system 20 may contain any number of point-to-point or multi-point combinations. As shown, the power source equipment 22 is connected to a first powered device 24 by link 30. In turn, the first powered device 24 is connected to a second powered device 26 by link 32. Further, alternatively, the first powered device 24 is connected to a third powered device 28 by link 34 or the second powered device 26 is connected to the third powered device 28 by link 34. Link 34 is shown as a partially dashed line to indicate that the dashed portion of the connection has two alternatives. In the first instance, the three powered devices 24, 26, and 28 are said to be connected in a star or tree, that is, the first is the center or trunk and the second and third radiate out from the center. In the second instance, the three powered devices 24, 26, and 28 are said to be linked in a chain, that is, the first is connected to the second which is connected to the third to form a chain. With more powered devices, it would of course be possible to combine the two instances. For example, one could add a fourth powered device (not shown) and link it to the second powered device 26. The combinations are theoretically endless with some practical limit. In any case, combinations involving two or more powered devices connected to a single port of the power source equipment will collectively be referred to as being multi-point or having a multi-point layout.

As implied in the lap top computer example above but not directly shown in FIG. 2, the system 20 may start out as point-to-point and become multi-point at some later time. The opposite is also true. For example, the user later still may disconnect the lap top computer from the IP telephone returning the system to point-to-point. The effect would be the same if the user plugs the lap top power cord into a power receptacle so that the lap top computer stops drawing inline power from the IP telephone. This example can be visualized with respect to FIG. 2 if one treats the first powered device 24 as the IP telephone, treats the second powered device 26 as the lap top computer, and ignores the third powered device 28. Then over time the example would run as follows: Initially, the system 20 starts out as point-to-point with power source equipment 22 and the IP telephone 24 connected by link 30. At some point later, the system 20 becomes multi-point with the addition of the lap top computer 26 connected to the IP telephone 24 by link 32. At some point later still, the system 20 returns to being point-to-point with the removal of the inline power demands of the lap top computer 26 either by disconnecting the link 32 or by plugging the lap top computer 26 into the wall thereby eliminating the power draw. Other similar examples are possible.

Returning to FIG. 2 as shown, each component of the system 20 is indicated to include a negotiator 40. Although the negotiators 40 are shown as distinct elements, they may be incorporated into other elements without departing from the inventive concepts disclosed herein. For example, the negotiator 40 could be embedded into a physical layer (PHY). The plurality of negotiators 40 enable the system 20 to communicate and resolve various inline power allocation issues. The negotiators 40 may cooperate under a number of arrangements including working under the direction of one of the negotiators 40, forming a consensus among the negotiators 40, or some combination of both. The negotiators 40 may take a number of forms including being identical to each other or being an array of different negotiators 40 depending on the circumstances. More specifically, the negotiator 40 for the power source equipment 22, for example, may take the form of a single unit, multiple units with one sub-unit for each port, or some combination of both. Whatever the form, the negotiators 40 would generally be capable of at least one way and probably two way communication depending on the circumstances. Any number of communications protocols are available. The communications could be carried over the various links 30, 32, and 34 of the system 20. Other communications channels are also possible.

Further, the negotiators 40 would generally be capable of performing at least one function in response to a negotiated decision. The function may include the request of a first component that a second component perform a function on their behalf. Depending on the arrangement, the decision may come from the negotiator 40 itself or from one or more of the other negotiators 40 in the system 20. The response function may directly affect the component containing the acting negotiator 40, it may directly or indirectly affect another component in the system 20, or some combination of both.

Although each component in the system 20 is indicated to include a negotiator 40, this may not necessarily be the case. Even if only one component includes a negotiator 40, some benefit may be achieved depending on the circumstances. The unilateral negotiated decision of the lone negotiator 40 may result in a response function that resolves one or more of the various inline power allocation issues. In addition to the case where a component fails to include a negotiator 40, the case may be that the negotiator 40 is inoperative. Such might be the situation when the component is running on other than inline power and therefore may have no role to play in the inline power allocation issues. Conversely, it is possible that a component in the system 20 that is not currently or that will never draw inline power, that is, a non-powered device (not shown), may include a negotiator 40 to provide greater flexibility in resolving various inline power issues. Such might be the case when the non-powered device acts as a conduit for supplying inline power to a powered device. The existence of one or more components without a negotiator 40 in the system 20 would not necessarily prevent the existing negotiators 40 from communicating. The data links 30, 32, and 34 or other communications channels, as the case may be, would still exist thus allowing the communications to bypass the component without the negotiator 40.

To accurately and successfully resolve the various inline power issues, a wide array of information about the assorted components of the system 20 may be needed. This information may be variously located such as distributed about the system 20, centralized for ease of access, or some combination of both. From the demand side, information for the powered devices 24, 26, and 28 may include measures such as the present power draw, the maximum power draw, and the predicted power draw. Further, this information may include the type of the powered device, the present mode of operation of the powered device, a Quality-of-Service level of the powered device, and the operating schedule of the powered device. From the supply side, information for the power source equipment 22 may include measures such as the present total output, the maximum total output, the present output per port, and the maximum output per port. Further, this information may include the status and amount of power supplied to the power source equipment 22. If the power source equipment 22 itself is externally powered, then a power outage that renders a primary power resource inoperative may leave the power source equipment 22 with nothing but a backup power resource which may prove insufficient. Of course the more information that is considered, then the more complicated the decision making process may become. However, the more information that is considered, then the more robust the decision may be. For a relatively simple and static system, a little information may be all that is needed. However, for a relatively complex and dynamic system, more information may be needed. This may be especially the case to encompass power outage and multi-point layout conditions.

Returning to the lap top computer example as applied to FIG. 2, there are a number of inline power allocation issues that may be encountered. For the sake of brevity only a few example issues will be presented. Those of ordinary skill in the art will be capable of envisioning many more issues that are possible and similarly resolvable by the present invention. Recall that the lap top computer example can be visualized with respect to FIG. 2 if one treats the first powered device 24 as the IP telephone, treats the second powered device 26 as the lap top computer, and ignores the third powered device 28. Initially, it will be assumed that the system 20 is under normal operating conditions with no outstanding issues to resolve and that the IP telephone 24 is not in use. At some point later, the user connects the lap top computer 26 to the IP telephone 24. The power draw of the lap top computer 26 may be an issue that needs to be resolved. The present or future mode of the lap top computer 26 may factor into any negotiated decision and any possible response function. For example, the lap top computer 26 may go into sleep mode in the future which would substantially reduce the power draw. At that time, a new negotiated decision may be called for. Similarly, the future occurrence of an incoming or outgoing call on the IP telephone 24 may be an issue that needs to be resolved. Putting the telephone to use may substantially increase its power draw. At that time, a new negotiated decision and response function may be called for. To accommodate the call, it may be necessary to reduce or cut off inline power to the lap top computer 26. The lap top computer 26 may be notified and agree to these changes so that it has a chance to compensate for the changes or the changes may just be implemented. The latter would more likely be the case if the lap top computer 26 did not include a negotiator 40, the power needs of the IP telephone 24 were given precedence, or both. Although not shown in FIG. 2, it is possible that the system 20 further includes powered devices connected to other ports of the power source equipment 22. If so, then the existence of these ports and powered devices may have or want to be factored into any negotiated decision and response function. For example, it may be possible to reallocate power from one port or powered device to another to resolve an issue. This too may be voluntary or mandatory.

Continuing with the lap top computer example, assume instead that the system 20 is operating under power outage conditions, that is, the power source equipment 22 is externally powered and something or someone has rendered the primary power resource inoperative thus leaving the power source equipment 22 with nothing but the backup power resource. Either initially or eventually, the backup power resource may prove insufficient. The power outage would likely present at least one and probably a series of issues until the primary power resource is restored or the backup power resource is completely spent. Under power outage conditions, a component hierarchy is useful but not necessary. So too, a comprehensive decision process rather than a component by component or port by port decision process is useful. For example, the IP telephone 24 would likely be given highest priority in the event that an emergency call needs to take place. In order to preserve power for any call, power to the lap top computer 26, other powered devices (28 and not shown), or both may want or need to be reduced or eliminated. The simplest decision would be to immediately shut off power to all low priority components. A more sophisticated approach would be to implement power savings incrementally. In either case, any variety of factors in addition to or instead of the component priority could be considered. For example, the component type, operation mode, or power draw might be considered. Further, the layout may be considered where multi-point ports are switched back to point-to-point by turning off all but one component on the port. Further still, time or power reserves might be considered where a port or component is cut off after a set amount of time has elapsed or below a set amount of power reserves. To ease the power transition, a port or component may be given a warning or the port or component may ask for a scheduling delay before power is changed. For instance, the lap top computer 26 might be scheduled five minutes to shut down or switch to its own backup resource. Whether the lap top computer 26 shuts down or gets power from its own battery, the inline power draw has been removed in either case.

Continuing with the lap top computer example, assume again that the system 20 is operating under normal conditions. A negotiation example based on IEEE standard power will be presented. Although not strictly necessary, IEEE standard power includes a classification scheme where powered devices can be classified into essentially three classes based on the maximum power draw of the device. Class 1 is the lowest, class 3 is the highest, and class 2 is in between. Under IEEE standard power, the classification is determined after the device is detected but before power is supplied to the device. Recall that the detection and powering algorithms of IEEE standard power are likely to be compromised by layouts that are multi-point as opposed to point-to-point. Consequently, the addition and removal of the lap top computer 26 may result in unpredictable performance and possibly damaged equipment. Given the right circumstances, it might be possible to negotiate a way around this risk. Initially, assume that the IP telephone 24 is detected and classified as class 2 and that the power source equipment 22 provides this power. At some point later, the user connects the lap top computer 26 to the IP telephone 24. Assume that together the IP telephone 24 and the lap top computer 26 have a maximum power draw that is more than class 2 but less than class 3. Under IEEE standard power, the power source equipment 22 may not allow the combination of components to draw more power than is allowed under class 2. The solution is for one or more of the negotiators 40, as the case may be, to fool the power source equipment 22 into reclassifying the IP telephone 24 as a class 3 device. If at some point later, the power draw of the lap top computer 26 is removed, then the IP telephone 24 could be reclassified again as a class 2 device. This reclassification technique is considered to be one embodiment of the negotiated decision and response functions generally described above.

Returning to FIG. 2 as shown, a method of inline power allocation for the system 20 would depend on the circumstances and configurations. Generally one or more of the components will identify an inline power allocation issue. The issue may be with the component itself or with one or more of the other components. Then one or more of the components may communicate with one or more of the other components to gather or spread information. If only one component includes a negotiator 40, then communication may be substantially limited. Then, depending on the arrangement, one or more of the components will reach a negotiated decision in an effort to resolve the identified inline power allocation issue. The decision may or may not come from the component or components that are the source of the inline power allocation issue. Then, based on the negotiated decision, one or more of the components may respond in an effort to resolve the identified inline power allocation issue. The response may or may not come from the component or components that are the source of the inline power allocation issue. As noted above, there are any number of responses available. Further, not every component may respond in the same manner but the responses would likely be coordinated in an attempt to implement the negotiated decision. One example response would be to reclassify at least one component in the system 20 as described above. It is possible however, that no response would be effective or any response might be counterproductive and thus no response would be performed.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A network power system for delivering inline power, the system comprising:
    a first power source equipment having at least one output power interface capable of transmitting inline power;
    a first powered device having an input power interface capable of receiving inline power; and
    a first transmission media capable of carrying inline power and having a first end and a second end, wherein the first end is coupled to the at least one output power interface of the first power source equipment and the second end is coupled to the input power interface of the first powered device,
    wherein at least one of the first power source equipment or the first powered device includes a first negotiator capable of negotiating a resolution to at least one inline power allocation issue arising from existing or predicted changes in power draw requirements and/or power supply characteristics, said requirements and/or characteristics being identified by information that is stored in the system and that is communicated to the first negotiator for use thereby in negotiating the resolution.

2. The system as defined in claim 1, wherein the first negotiator at least participates in the formation of a negotiated decision with respect to the at least one inline power allocation issue.

3. The system as defined in claim 1, wherein the first negotiator performs at least one response function based on a negotiated decision with respect to the at least one inline power allocation issue.

4. The system as defined in claim 1, further comprising a non-powered device including a negotiator capable of communicating and resolving at least one inline power allocation issue.

5. The system as defined in claim 1, wherein the at least one powered device further includes an output power interface capable of transmitting inline power, the system further comprising:
    at least a second powered device having an input power interface capable of receiving inline power; and
    a second transmission media capable of carrying inline power and having a first end and a second end, wherein the first end is coupled to the output power interface of the at least one powered device and the second end is coupled to the input power interface of the at least a second powered device.

6. The system as defined in claim 5, wherein the at least a second powered device further includes a negotiator capable of communicating and resolving at least one inline power allocation issue.

7. A method of inline power allocation for a network power system having at least two components coupled together, wherein at least a first component is a power source equipment capable of transmitting inline power, at least a second component is a powered device capable of receiving inline power, and at lease one of the at least two components includes a first negotiator capable of communicating and resolving at least one inline power allocation issue, the method comprising:
    storing, in the network power system, information identifying power draw requirements of a powered device and/or power supply characteristics of a power source equipment;
    communicating the stored information to the first negotiator;
    identifying, based on the communicated information, an inline power allocation issue arising from existing or predicted changes in power draw requirements and/or power supply characteristics;
    communicating as suitable within the network power system; and
    reaching a negotiated decision in an effort to resolve the identified inline power allocation issue.

8. The method as defined in claim 7, further comprising responding based on the negotiated decision in an effort to resolve the identified inline power allocation issue.

9. The method as defined in claim 8, wherein responding comprises reclassifying at least one component in the network power system.

10. An apparatus for inline power allocation for a network power system having at least two components coupled together, wherein at least a first component is a power source equipment capable of transmitting inline power, at least a second component is a powered device capable of receiving inline power, and at lease one of the at least two components includes a first negotiator capable of communicating and resolving at least one inline power allocation issue, the apparatus comprising:

means for storing, in the network power system, information identifying power draw requirements of a powered device and/or power supply characteristics of a power source equipment;

means for communicating the stored information to the first negotiator;

means for identifying, based on the communicated information, an inline power allocation issue arising from existing or predicted changes in power draw requirements and/or power supply characteristics;

means for communicating as suitable within the network power system; and means for reaching a negotiated decision in an effort to resolve the identified inline power allocation issue.

11. The apparatus as defined in claim 10, further comprising means for responding based on the negotiated decision in an effort to resolve the identified inline power allocation issue.

12. A computer-readable medium having stored thereon computer-executable instructions for performing a method of inline power allocation for a network power system having at least two components coupled together, wherein at least a first component is a power source equipment capable of transmitting inline power, at least a second component is a powered device capable of receiving inline power, and at lease one of the at least two components includes a first negotiator capable of communicating and resolving at least one inline power allocation issue, the method comprising:

storing, in the network power system, information identifying power draw requirements of a powered device and/or power supply characteristics of a power source equipment;

communicating the stored information to the first negotiator;

identifying, based on the communicated information, an inline power allocation issue arising from existing or predicted changes in power draw requirements and/or power supply characteristics;

communicating as suitable within the network power system; and reaching a negotiated decision in an effort to resolve the identified inline power allocation issue.

13. The computer-readable medium as defined in claim 12, wherein the method further comprises responding based on the negotiated decision in an effort to resolve the identified inline power allocation issue.

14. The computer-readable medium as defined in claim 13, wherein responding comprises reclassifying at least one component in the network power system.

15. A power source equipment (PSE) for a network power system for delivering inline power, the PSE comprising:

at least one output power interface capable of transmitting inline power; and at least one negotiator capable of communicating and at least partially resolving at least one inline power allocation issue arising from existing or predicted changes in power draw requirements and/or power supply characteristics identified by information stored in the network power system and communicated to the at least one negotiator for use thereby in partially resolving said at least one inline power allocation issue.

16. The PSE as defined in claim 15, wherein the negotiator of the PSE is one of a plurality of negotiators in the network power system and the negotiator in the PSE has primary authority for reaching a negotiated decision in an effort to resolve the at least one inline power allocation issue.

17. The PSE as defined in claim 15, wherein the negotiator of the PSE is one of a plurality of negotiators in the network power system and the negotiator in the PSE has substantially equal authority for reaching a negotiated decision in an effort to resolve the at least one inline power allocation issue.

18. The PSE as defined in claim 15, wherein the negotiator of the PSE takes the form of a single unit.

19. The PSE as defined in claim 15, wherein the negotiator of the PSE takes the form of two sub-units with a first sub-unit being centralized and a second sub-unit being associated with the at least one output power interface.

20. The PSE as defined in claim 19, wherein the second sub-unit of the negotiator of the PSE is inoperative when no inline power is being transmitted from the at least one output power interface.

21. The PSE as defined in claim 15, wherein the negotiator of the PSE is embedded into a physical layer of the PSE.

22. The PSE as defined in claim 15, wherein the negotiator of the PSE is capable of performing at least one response function based on a negotiated decision in an effort to resolve the at least one inline power allocation issue.

23. The PSE as defined in claim 22, wherein the at least one response function includes at least reducing the transmission of inline power from the at least one output power interface.

24. The PSE as defined in claim 22, wherein the at least one response function includes transmitting a request that a component coupled to the at least one output power interface act to at least reduce the consumption of inline power from the at least one output power interface.

25. The PSE as defined in claim 22, wherein the at least one response function includes terminating the transmission of inline power from the at least one output power interface to all but one powered device coupled to the at least one output power interface.

26. The PSE as defined in claim 22, wherein the at least one response function includes reclassifying at least one powered device coupled to the at least one output power interface.

27. The PSE as defined in claim 15, wherein the negotiator of the PSE maintains at least one piece of information selected from the group consisting of a present total inline power output, a maximum total inline power output, a present inline power output per power interface, a maximum inline power output per power interface, a status of the PSE, and an amount of power supplied to the PSE.

28. The PSE as defined in claim 15, wherein the negotiator of the PSE considers at least one factor selected from the group consisting of a power interface priority, a powered device priority, a powered device type, a PSE operation mode, a powered device operation mode, a powered device power draw, a time limit, a time schedule, and a power reserve level.

29. A powered device (PD) for a network power system for delivering inline power, the PD comprising:

an input power interface capable of receiving inline power; and a negotiator capable of communicating and at least partially resolving at least one inline power allocation issue arising from existing or predicted changes in power draw requirements and/or power supply characteristics identified by information stored in the network power system and communicated to the negotiator for use thereby in partially resolving said at least one inline power allocation issue.

30. The PD as defined in claim 29, wherein the negotiator of the PD is one of a plurality of negotiators in the network power system and the negotiator in the PD has primary authority for reaching a negotiated decision in an effort to resolve the at least one inline power allocation issue.

31. The PD as defined in claim 29, wherein the negotiator of the PD is one of a plurality of negotiators in the network power system and the negotiator in the PD has substantially equal authority for reaching a negotiated decision in an effort to resolve the at least one inline power allocation issue.

32. The PD as defined in claim 29, wherein the negotiator of the PD is inoperative when no inline power is being drawn by the PD from the input power interface.

33. The PD as defined in claim 29, wherein the negotiator of the PD is embedded into a physical layer of the PD.

34. The PD as defined in claim 29, wherein the negotiator of the PD is capable of performing at least one response function based on a negotiated decision in an effort to resolve the at least one inline power allocation issue.

35. The PD as defined in claim 34, wherein the at least one response function includes at least reducing the amount of inline power drawn by the PD from the input power interface.

36. The PD as defined in claim 34, wherein the PD further comprises an output power interface for transmitting inline power and the at least one response function includes transmitting a request that a component coupled to the output power interface act to at least reduce the consumption of inline power from the output power interface.

37. The PD as defined in claim 34, wherein the PD further comprises an output power interface for transmitting inline power and the at least one response function includes terminating the transmission of inline power from the output power interface.

38. The PD as defined in claim 34, wherein the at least one response function includes reclassifying the PD.

39. The PD as defined in claim 29, wherein the negotiator of the PD maintains at least one piece of information selected from the group consisting of a present power draw, a maximum power draw, a predicted power draw, a PD type, a PD operation mode, a PD Quality-of-Service level, and a PD operating schedule.

40. The PD as defined in claim 29, wherein the negotiator of the PD considers at least one factor selected from the group consisting of a power source equipment power interface priority, a PD priority, a PD type, a power source equipment operation mode, a PD operation mode, a PD power draw, a time limit, a time schedule, and a power source equipment power reserve level.

* * * * *